(12) United States Patent
Shen (10) Patent No.: US 6,901,847 B1
(45) Date of Patent: Jun. 7, 2005

(54) CONTAINER FOR MAKING TEA AND THE SAME

(76) Inventor: Tzu Yuan Shen, No. 15, Hsi An Lane, Puli Township, Nantou County (TW)

(*) Notice: Subject to any disclaimer, the term of this patent is extended or adjusted under 35 U.S.C. 154(b) by 0 days.

(21) Appl. No.: 10/924,790

(22) Filed: Aug. 25, 2004

Related U.S. Application Data (63) Continuation-in-part of application No. 10/753,459, filed on Jan. 9, 2004, now Pat. No. 6,786,137.

(51) Int. Cl.[7] .............................. A23L 1/00; A47J 31/00; A47J 31/02; A47J 31/18; A47J 43/28
(52) U.S. Cl. ............................... 99/323; 99/279; 99/495
(58) Field of Search ......................... 99/495, 494, 484, 99/275, 295, 279, 297, 322, 323, 316–319; 221/316–319, 312 C; 220/23.8, 912, 712, 713, 718; 222/54; 206/219, 222; 210/474–479, 181, 282; 426/77, 110, 78, 86, 112, 134, 115, 120, 82–84, 6, 432, 433, 435

(56) References Cited

U.S. PATENT DOCUMENTS

| | | | | |
|---|---|---|---|---|
| 786,666 A | * | 4/1905 | McKenzie | 99/319 |
| 2,788,733 A | * | 4/1957 | Gerard | 99/323 |
| 3,750,559 A | * | 8/1973 | Wakabayashi | 99/279 |
| 3,854,389 A | * | 12/1974 | Hillemann | 99/295 |
| 5,775,205 A | * | 7/1998 | Melton | 99/322 |
| 6,283,013 B1 | * | 9/2001 | Romandy et al. | 99/322 |
| 6,327,965 B1 | * | 12/2001 | Lin Tien | 99/299 |
| 6,343,542 B1 | * | 2/2002 | Shen | 99/299 |
| 6,372,270 B1 | * | 4/2002 | Denny | 426/77 |
| 6,477,942 B1 | * | 11/2002 | Guu | 99/285 |
| 6,481,337 B1 | * | 11/2002 | Guu | 99/285 |
| 6,494,128 B1 | * | 12/2002 | Yu | 99/285 |
| 6,994,129 | * | 12/2002 | Lin | 99/320 |

* cited by examiner

Primary Examiner—Timothy F. Simone
(74) Attorney, Agent, or Firm—Rosenberg, Klein & Lee

(57) ABSTRACT

A container has a body having a receiving space therein and a first opening and a second opening at opposite sides of the receiving space. The first opening has a diameter smaller than that of the second opening. A first cap is detachably secured to the body to close the first opening. On an interior side of the first cap has a first inner threaded section, a pad, which is made of a soft material for waterproof, a disk having a post and an aperture and a second inner threaded section. A filter cup is detachably mounted in the received space of the body adjacent to the second opening. The filter cup has an opening facing the second opening of the body and a protrusion on an exterior surface thereof to position the filter cup at the second opening of the body.

9 Claims, 9 Drawing Sheets

CONTAINER FOR MAKING TEA AND THE SAME

CROSS-REFERENCE TO RELATED APPLICATION

This application is a Continuation-In-Part Application of Ser. No. 10/753,459 filed Jan. 9, 2004, and entitled "CONTAINER FOR MAKING TEA", now U.S. Pat. No. 6,786,137.

BACKGROUND OF THE INVENTION

1. Field of the Invention

The present invention relates to a container, and more particularly to a container for making tea, coffee and the same, which keeps tea leaves or milled coffee in water and prevents the tea leaves or coffee powder from pouring out.

2. Description of Related Art

Figure 8:
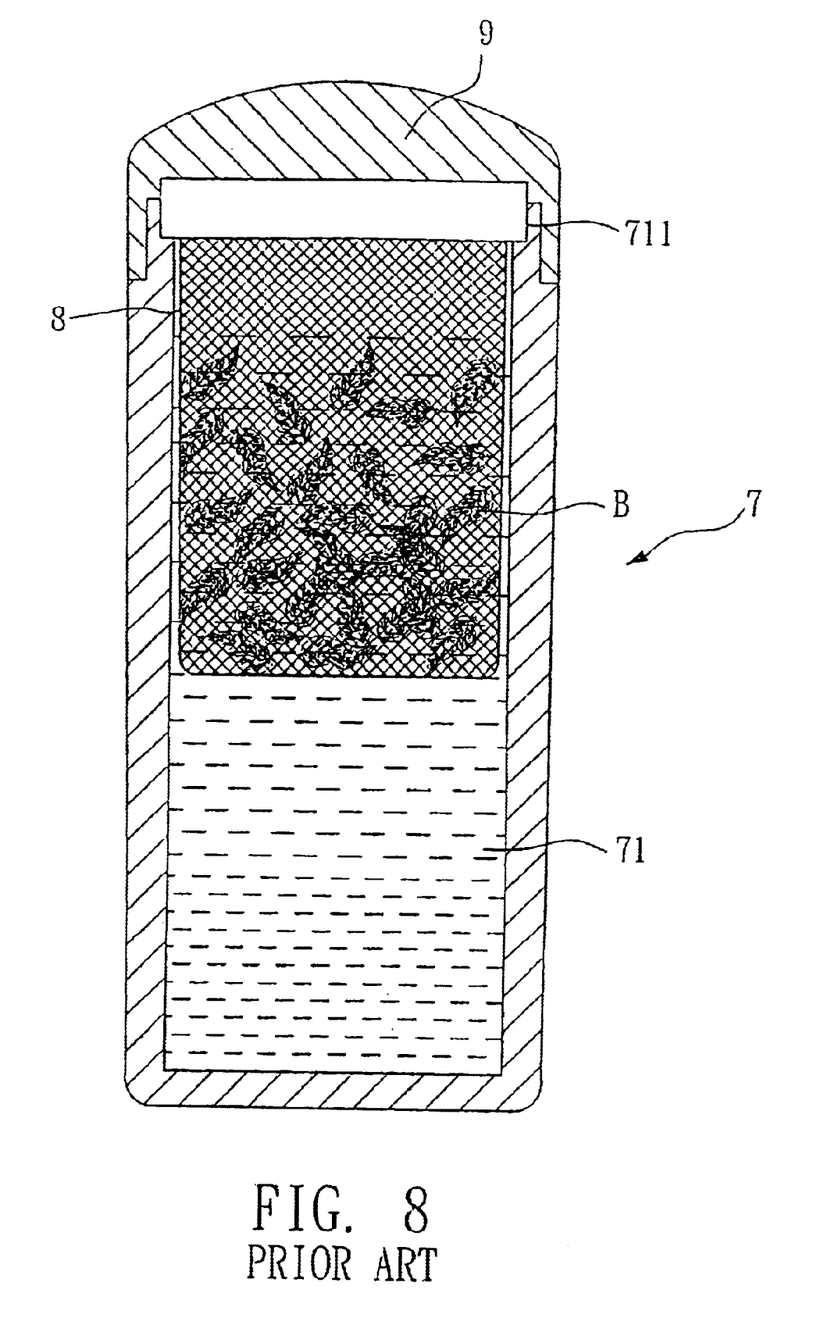
FIG. 8 and FIG. 9 are sectional views of the conventional container.

As shown in FIG. 8, a conventional container for making tea in accordance with the prior art comprises a body 7 with a receiving space 71 longitudinally defined therein. The receiving space 71 extends to a top of the body 7 to define an opening 711. A filter cup 8 is receiving in an upper portion of the receiving space 71 for receiving tea leaves. A cover 9 is detachably secured to the top of the body 7 for closing the opening 711 in the body 7.

When making tea, some tea leaves B is put into the filter cup 8 and the hot water is poured into the receiving space 71 via the filter cup 8 for dipping the tea leaves B. The tea leaves B can fully stretch in the filter cup 8. The tea is finished when the tea leaves fully stretch.

Figure 9:
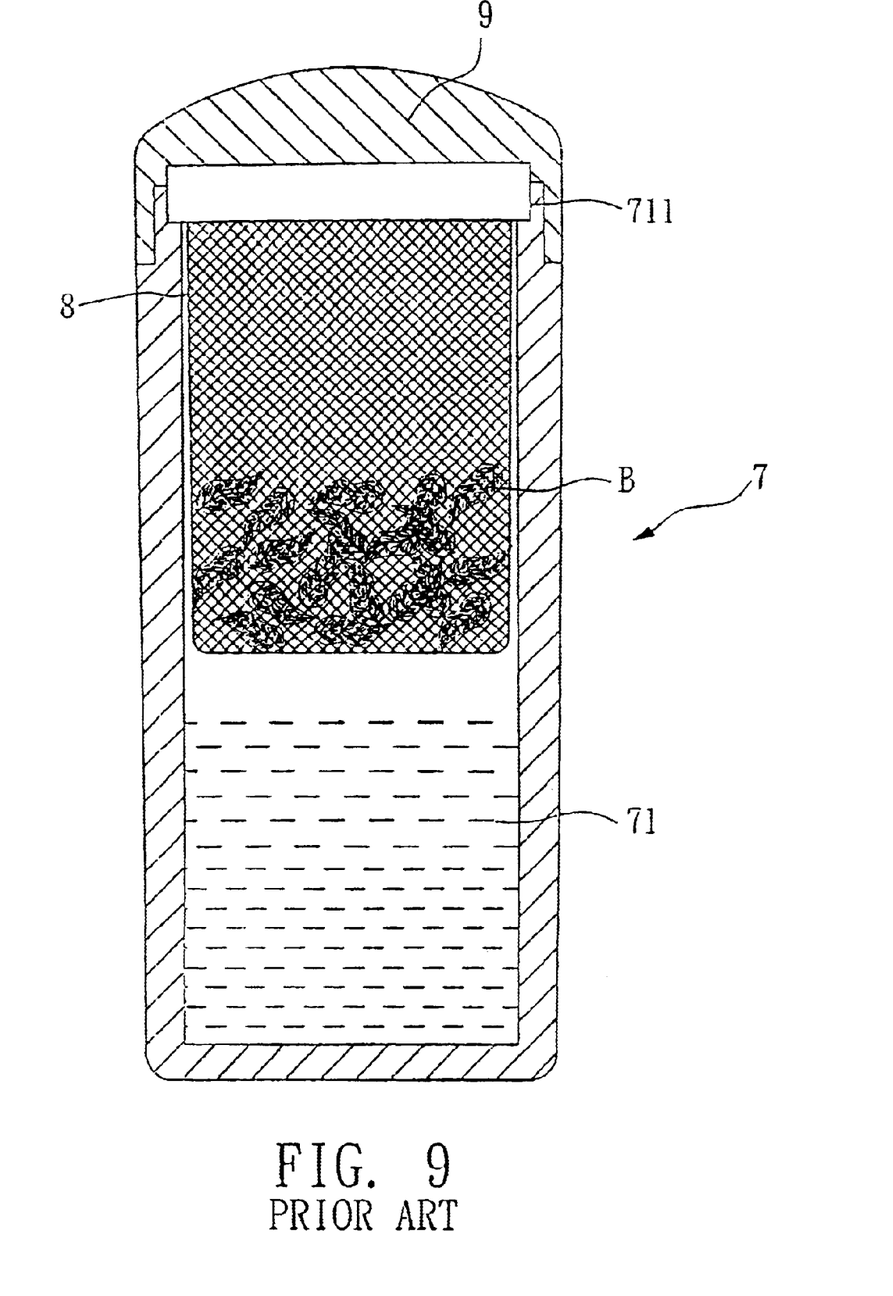

However, the filter cup 8 is received in the upper portion of the receiving space 71 so that the height of the level of the hot water must higher that that of the tea leaves for fully dipping tea leaves B. As a result, the tea leaves B may not be fully dipped in the hot water when the water is drunken in the dip process and the tea in the body 7 is always thin as shown in FIG. 9.

In addition, the openings of the filter cup 8 and the body 7 are in the same direction so that the tea leaves may moved into the mouth of the drinker with the tea during drinking. Consequently, the drinker may feel uncomfortable.

The present invention has arisen to mitigate and/or obviate the disadvantages of the conventional container for making tea.

SUMMARY OF THE INVENTION

The main objective of the present invention is to provide an improved container. The container can dip tea leaves well and prevent the tea leaves moved into the user's mouth during drinking.

To achieve the objective, a container in accordance with the present invention comprises a body having a receiving space therein and a first opening and a second opening at opposite sides of the receiving space. The first opening has a diameter smaller than that of the second opening. A first cap is detachably secured to the body to close the first opening. On an interior side of the first cap has a first inner threaded section, a pad, which is made of a soft material for waterproof, a disk having a post and an aperture and a second inner threaded section. A filter cup is detachably mounted in the received space of the body adjacent to the second opening. The filter cup has an opening facing the second opening of the body and a protrusion on an exterior surface thereof to position the filter cup at the second opening of the body.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1–6, a container in accordance with the present invention comprises a body 1 having a receiving space 2 longitudinally defined therein and extending therethrough to define a first opening 21 on a top 11 of the body 1 and a second opening 22 in a bottom 12 of the body 1. The first opening 21 has a diameter smaller than that of the receiving space 2. The body 1 has a first threaded section 211 and a second threaded section 221 on an outer periphery of the body 1. The first threaded section 211 and the second threaded section 221 respectively correspond to the first opening 21 and the second opening 22. A first cap 3 and a second cap 4 are provided to close the first opening 21 and the second opening 22. In the present preferred embodiment, the first cap 3 has a first inner threaded section 311 on an interior side 31 thereof to be engaged with the first threaded section 211 of the body 1, a pad 32, which is made of a soft material, such as silicon gel for leakproof, a disk 33 with an aperture 331 and a post 332 and a second inner threaded section 312 to be engaged with a top cap 34. The disk 33 has the post 332 inserted into a hole 322 of the pad 32 to bond the pad 32 on the disk 33 and to prevent the pad 32 from bonding in a wrong direction. The pad 32 has a gap 321 for gas flowing through the aperture 331.

Figure 1:
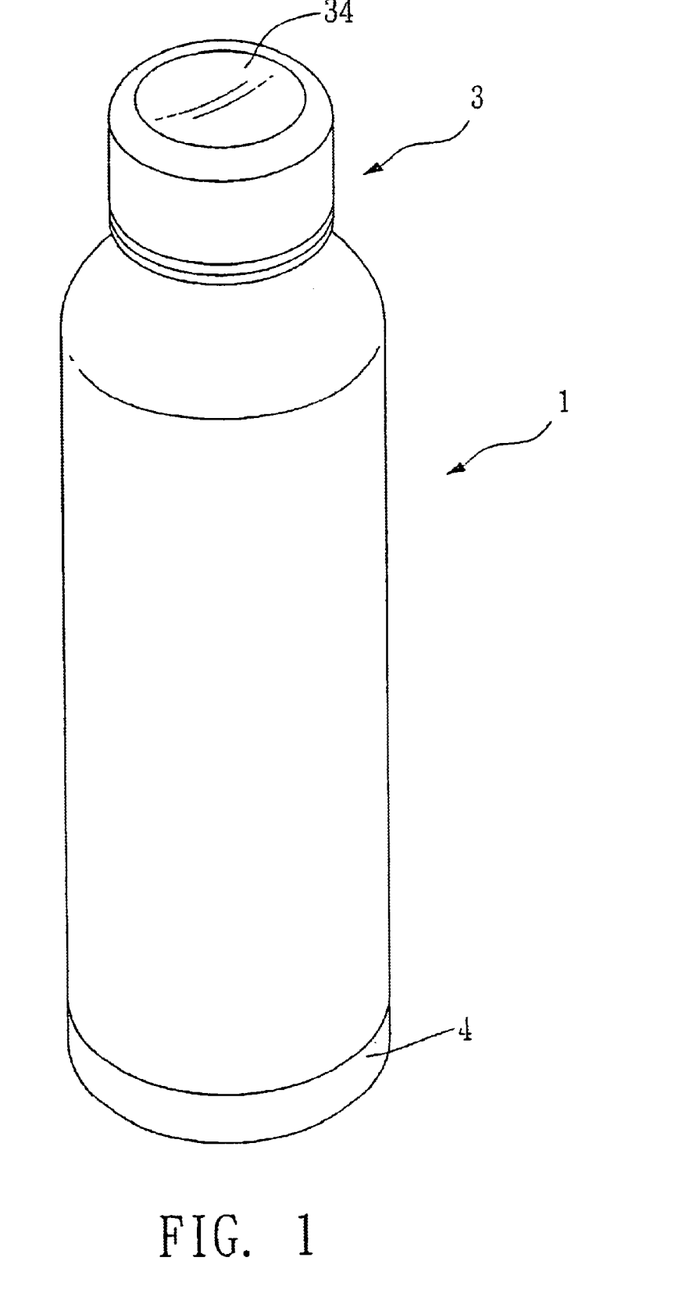
FIG. 1 is a perspective view of a first preferred embodiment of the present invention.
Figure 2:
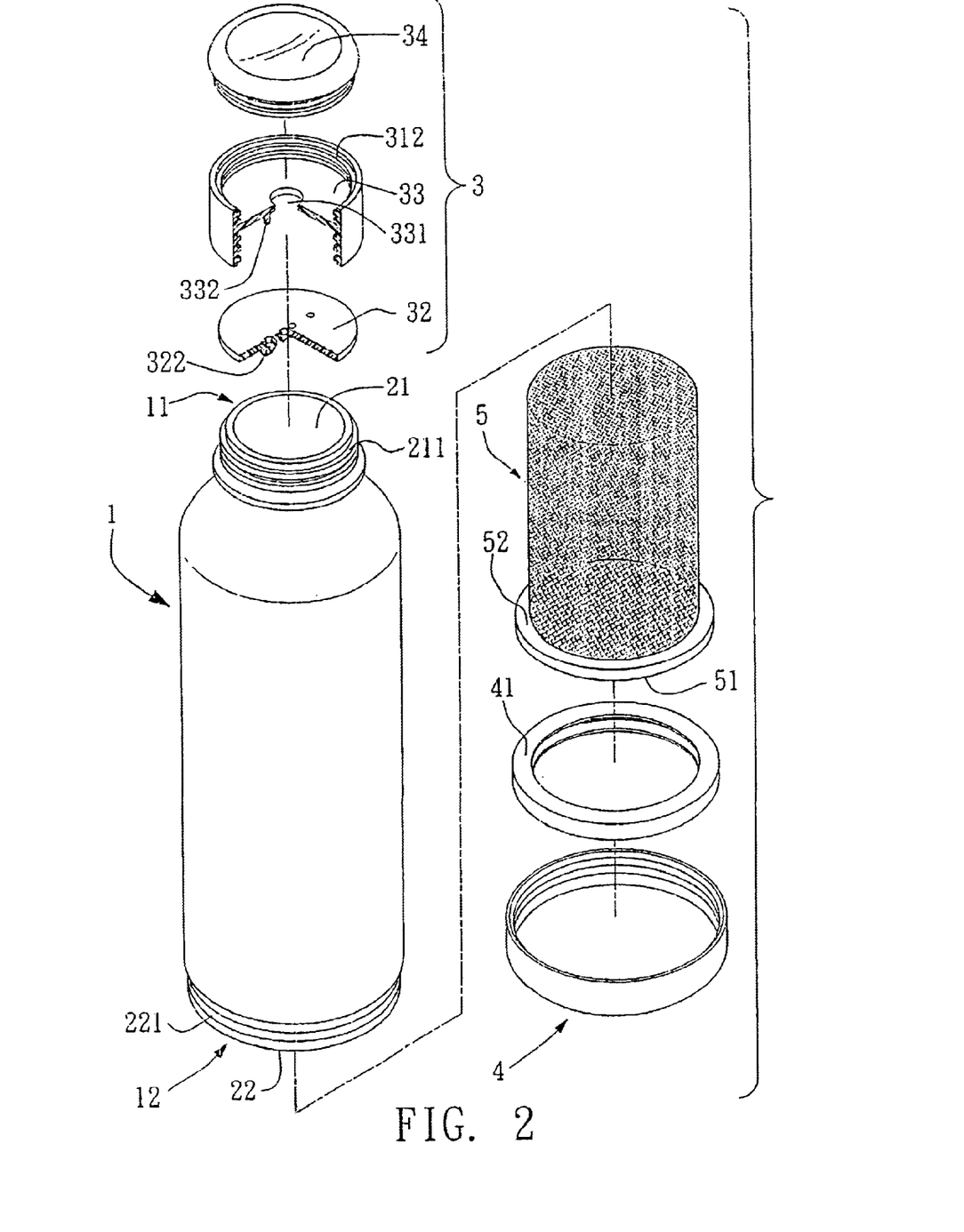
FIG. 2 is an exploded view of the first preferred embodiment of the present invention.
Figure 3:
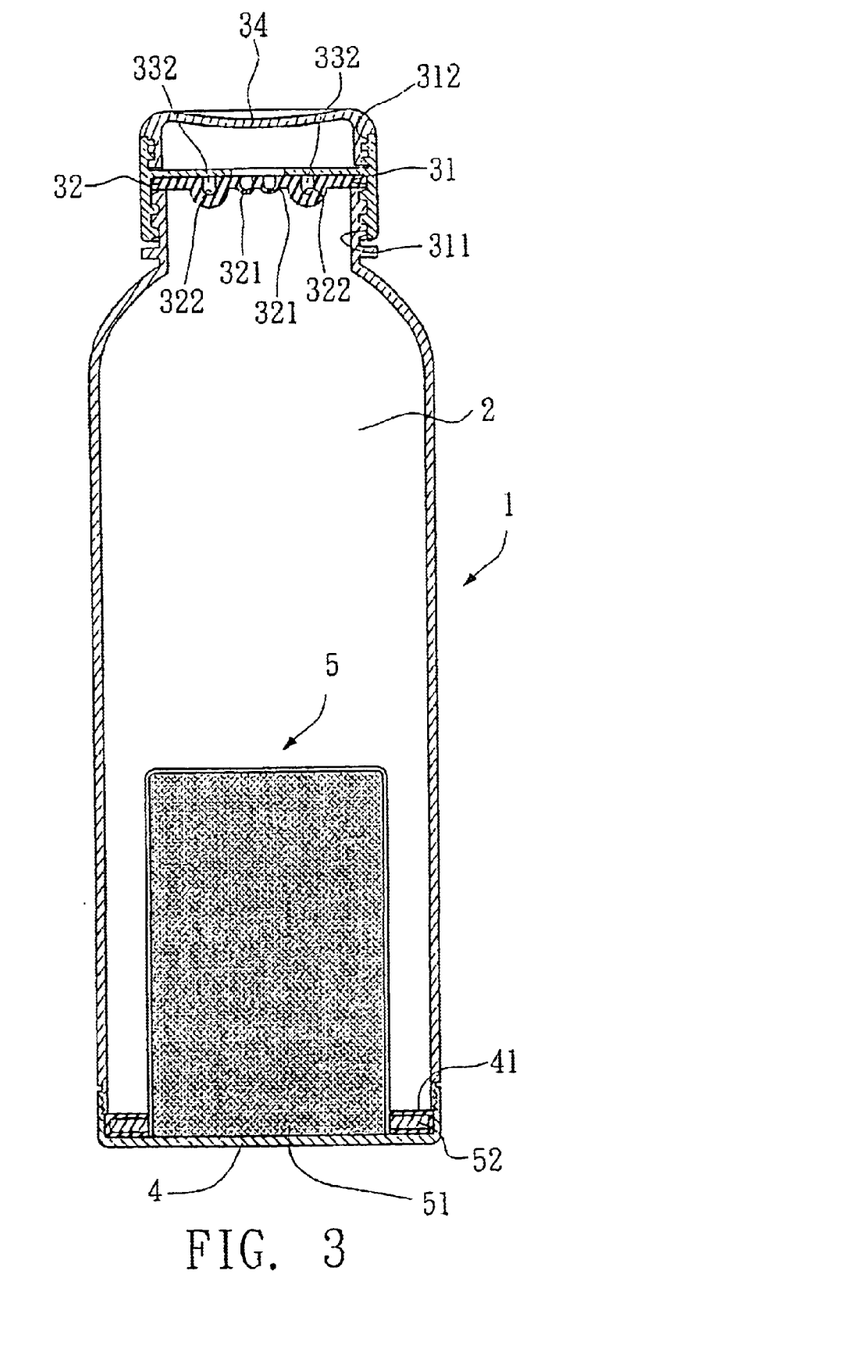
FIG. 3 is a front view of the first preferred embodiment of the present invention.

A filter cup 5, which has a metal net and plural posts, is received in a lower portion of the receiving space 2 for containing tea leaves A and has an opening 51 defined to correspond the second opening 22 in the bottom 12 of the body 1. The second opening 22 of the body 1 and the opening 51 of the filter cup 5 are located at same level. An annular protrusion 52 outwardly extends from the filter cup 5 and abuts the bottom 12 of the body 1. The annular protrusion 52 has a diameter greater than that of the bottom 12 of the body 1 to be attached on the body 1 around the second opening 22. The second cap 4 is screwed for engagement with the second threaded section 221 to be secured to the body 1. The protrusion 52 of the filter cup 5 is located at between the body 1 and the second cap 4.

In a normal condition, the filter cup 5 is located at a lower portion of the receiving space 2 of the body 1. In the present preferred embodiment, a leakproof element 42 is mounted on the protrusion 52 for sealing of the second opening 22.

The leakproof element 42 prevents water in the receiving space 2 from leakage and prevents tea leaves from accumulation in the second threaded section 221. As a result, it is tighter between the protrusion 52 and the second cap 4.

Figure 4:
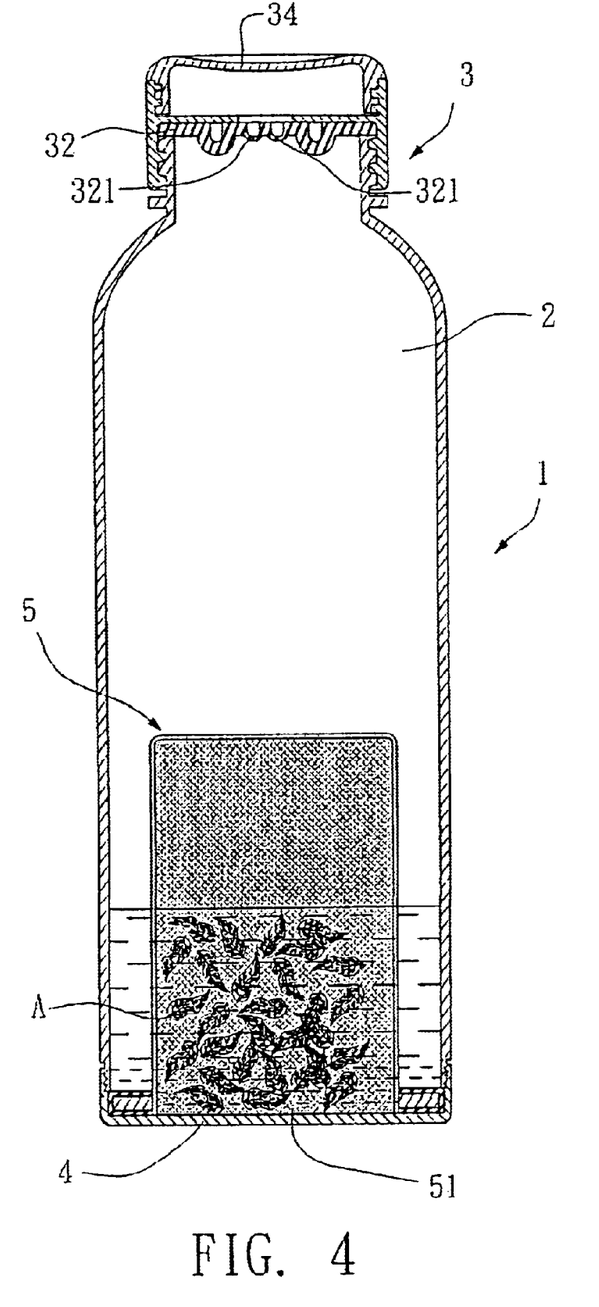
FIG. 4 and FIG. 5 are perspective view of the first preferred embodiment of the present invention in use.

As shown in FIG. 4, the container of the present invention is turned upside down for the opening 51 of the filter cup 5 at top, loose the second cup 4 and then put tea leaves A and hot water into the filter cup 5. After that the second cap 4 is screwed back, and then turns the container upside down again to the normal condition, in which the opening 51 of the filter cup 5 is at bottom. The filter cup 5 traps the tea leaves A therein, which makes the tea leaves A being restricted in the lower portion of the receiving space 2, so that the tea leaves A will always be dipped in water.

Figure 5:
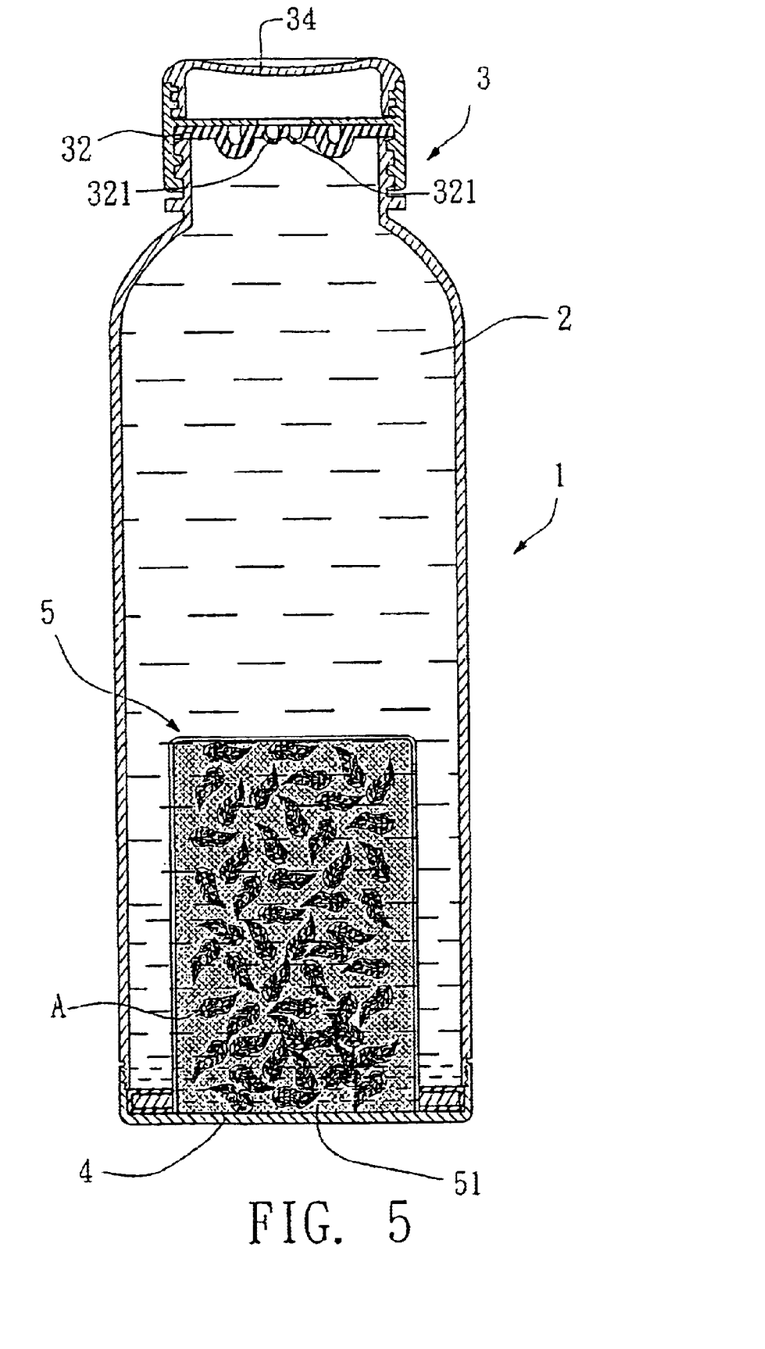

As shown in FIG. 5, the pad 32 and the leakproof element 41 can provide an airtight condition of the cap 4, the body 1 and the cover 5 so that the hot water in the receiving space 2 should never leak when the body 1 is shocked.

In the preferred embodiment of the present invention, the second cap 4 has a diameter equal to that of the body 1 for providing an integral appearance. The first opening 21 has a diameter smaller than that of the second opening 22 that facilitates people drinking tea or coffee via the first opening 21. The filter cup 5 traps the tea leaves A therein, so that the tea leaves A will never get out while the container is tilted to pour tea out.

Figure 6:
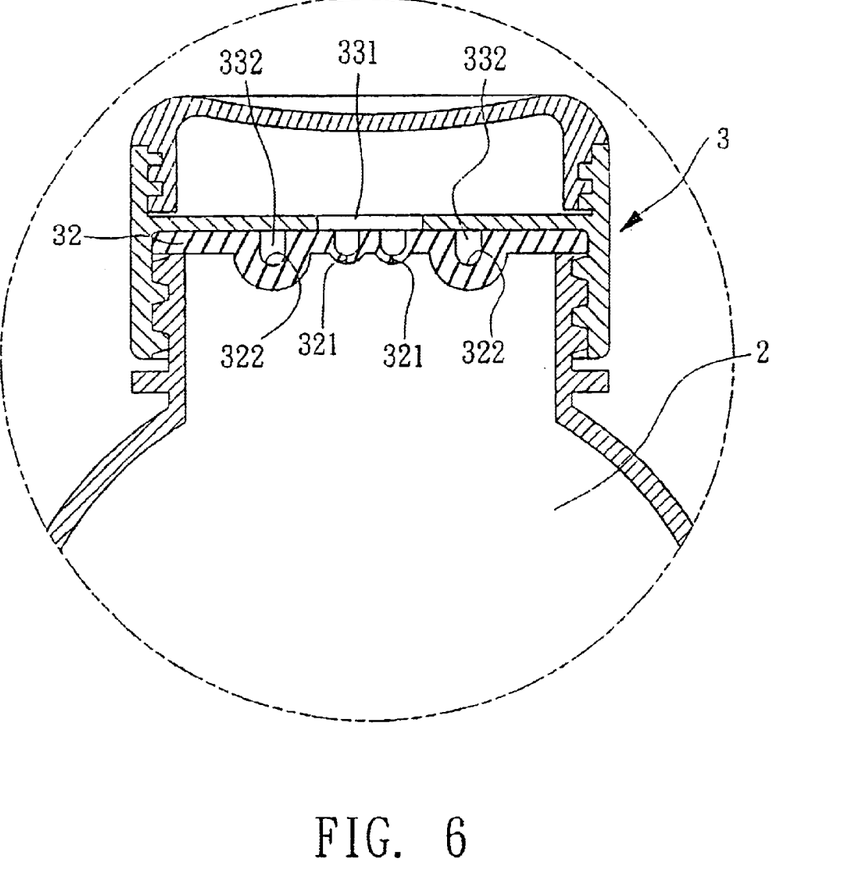
FIG. 6 is an enlarged view in part of the first preferred embodiment of the present invention.

The gas in the receiving space 2 will expand due to the temperature of the hot water in the body 1. The expanding air will push the pad 32 outwardly and open the gap 321. In the present preferred embodiment, the gap 321 is U-shaped at opposite sides to escape the hot gas therethrough. As shown in FIG. 6, after the hot gas escaping out, the cold gas flows back into the receiving space 2 of the container via the gap 321 again to adjust the pressure in the receiving space 2. As a result, there is no pressure problem in the receiving space 2, which makes the first cap 3 hard to screw because of the variety of pressure in the receiving space 2 while the water getting cold. The container of the present invention can make tea, coffee, dry flower and so on.

Figure 7:
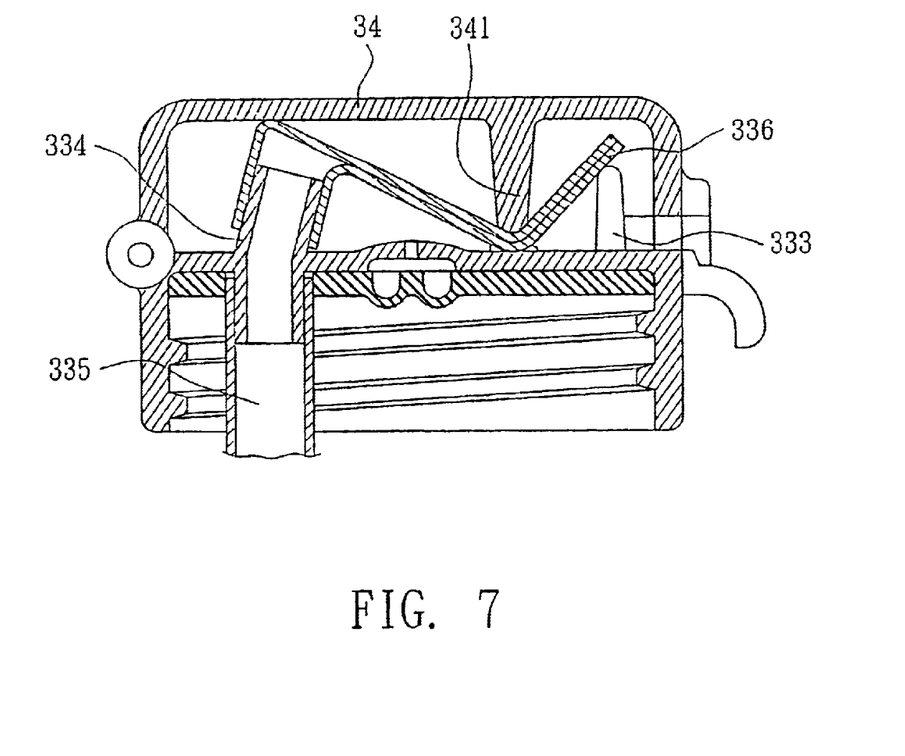
FIG. 7 is an exploded perspective view in part of a second preferred embodiment of the present invention.

FIG. 7 show a second embodiment of a container in accordance with the present invention, in which the container has a first cap 3 and a disk 33 having a block 333 and an opening portion 334 through the disk 33. A first tube 335 is connected to the opening portion 334 of the disk 33 and received in a body 1 and a second tube 336 is connected to the opening portion 334 of the disk 33 opposite to the first tube 335 that people can drink tea or coffee in the body 1 via the second tube 336. A top cap 34 is pivotally connected to the first cap 3 and has a block 341 at a bottom side thereof. The blocks 332 and 341 compress the second tube 336 therebetween to store the second tube between the disk 33 and the top cap 34.

In conclusion, the container of the present invention has double openings and the filter cup 5 is located at the lower portion of the receiving space 2 in the normal condition. The tea leaves A are trapped in the filter cup 5 to always sink the tea leaves A in the water. The gap 321 of the pad 32 is sealed in the normal condition and is open while the container has hot water in the receiving space 2 to flow the steam out for adjustment of the pressure in the receiving space 2. The first opening 21 is smaller than the second opening 22. The first opening 21 is designated as an opening that people drinks the drink in the container. The second opening 22 is designated as an opening that people fill water in the container. The container of the present invention facilitates user to use and carry in any place and in any activity.

Although the invention has been explained in relation to its preferred embodiment, it is to be understood that many other possible modifications and variations can be made without departing from the spirit and scope of the invention as hereinafter claimed.

What is claimed is:

1. A container, comprising:
   a body having a receiving space therein, and a first opening and a second opening at opposite sides of the receiving space, wherein the first opening is on a top of the body and the second opening is on a bottom of the body in a normal condition and the first opening has a diameter smaller than that of the second opening;
   a first cap detachably secured to the body to close the first opening, wherein on an interior side of the first cap has a first inner threaded section, a pad, which is made of a soft material for waterproof, a disk having a post and an aperture and a second inner threaded section, and
   a filter cup detachably mounted in the receiving space of the body adjacent to the second opening, wherein the filter cup has an opening facing the second opening of the body and a protrusion on an exterior surface thereof to position the filter cup at the second opening of the body.

2. The container as claimed in claim 1, wherein the body has a first threaded section and a second threaded section adjacent to the first opening and the second opening to be engaged with inner threads of the first cap and the second cap respectively.

3. The container as claimed in claim 1, wherein the pad has a gap to flow gas therethrough and a hole, in which the post is inserted.

4. The container as claimed in claim 3, wherein the pad has U-shaped portions at opposite side of the gap.

5. The container as claimed in claim 1, further comprising a leakproof element provided between the protrusion of the filter cup and the second cap.

6. The container as claimed in claim 1, wherein the protrusion of the filter cup is an annular element which an outer diameter thereof is greater than a diameter of the second opening of the body.

7. The container as claimed in claim 1, further comprising a top cap pivotally connected to the first cap and having a block at a side facing the body.

8. The container as claimed in claim 1, wherein the disk has a block and an opening portion and a first tube and a second tubes are connected to opposite sides of the opening portion respectively and the first tube is received in the body.

9. The container as claimed in claim 8, wherein the second tube is compressed by the blocks of the top cap and the disk to store the second tube between the disk and the top cap.

* * * * *